United States Patent Office 3,048,523

Patented Aug. 7, 1962

3,048,523

LIVE POLIOMYELITIS VIRUS COMPOSITION AND PROCESS

Gerald E. Underwood, Charleston Township, Kalamazoo County, Mich., assignor to The Upjohn Company, Kalamazoo, Mich., a corporation of Delaware No Drawing. Filed Mar. 28, 1960, Ser. No. 17,766
14 Claims. (Cl. 167—78)

This invention pertains to compositions of matter and to a process. More particularly, the invention is directed to a process for inactivating live adventitious viral contaminants in suspensions of live poliomyelitis virus, while leaving the live poliomyelitis virus intact, and in this way obtaining the said suspensions free from infective contaminant virus.

A major problem in the artificial propagation of poliomyelitis virus in tissue cultures arises from contamination by adventitious virus. The contaminant virus is generally introduced via the tissue cells in which the poliomyelitis virus is propagated. Monkey kidney cells are commonly used, and any monkey might be infected with a virus that is endemic among monkey populations in their native habitats. Monkeys can also become infected with virus transmitted as a result of handling and contacts with humans prior to use. Some 40 simian viral agents have been encountered and described; some of them, for example, the B-virus (see Sabin, Jour. Exptl. Med., 59, 115–136, 1934; and Pierce et al., Am. Jour. Hyg., 68, 242–250, 1958) are pathogenic.

Prior to this invention the problem of contamination of commercial batch cultures or laboratory serial passages of poliomyelitis virus by adventitious virus was unresolved, and the only assurances of "purity" were afforded by negative tests for contaminating viruses. The test procedures are not completely satisfactory, however, since there is always a chance that an unidentified live viral contaminant will escape detection. While some of the adventitious viral contaminants (e.g., "foamy agents") are easily detected by cytopathogenic changes in uninoculated control cultures, other can be detected only by complicated methods involving serum neutralization of the poliomyelitis virus followed by isolation, further culturing, and characterization. Such safety test procedures are time-consuming and expensive and a simpler method for obtaining uncontaminated live poliomyelitis virus is urgently needed. Moreover, the prior art safety tests are subject to error and the routine procedures might fail to detect an unidentified virus that propagates slowly and does not destroy the culture cells or cause recognizable disease in test animals.

It has now been discovered that adventitious viral contaminants in suspensions containing artificially propagated live poliomyelitis virus are inactivated by an antiviral α-oxoaldehyde of the kind disclosed herein. Consequently, for example, a culture medium containing live poliomyelitis virus known to be contaminated with, or suspected of being contaminated with a live adventitious viral contaminant, can be treated with an antiviral α-oxoaldehyde so as to inactivate the adventitious viral contaminant or to reduce the contaminant to such a low level as to be innocuous, while leaving the live poliomyelitis virus intact. In this way, a culture medium containing live poliomyelitis virus and an adventitious viral contaminant can be freed of contamination, or a culture medium containing live poliomyelitis virus that has been tested for adventitious virus can be treated in order to be sure that no live undetected adventitious virus remains. Therefore, the process of this invention can be applied as an adjunctive treatment to cultures which have been shown by recognized tests for adventitious virus to be contaminated cultures, or, as a safety measure, the process can be applied to those cultures indicated by such tests to be free of contamination. Furthermore, the process can be applied to culture media as harvested, while minimizing the safety test procedures usually used to determine viral contamination. However practiced, the process of the invention provides a simple and effective treatment for suspensions of live poliomyelitis virus whereby deleterious contamination due to adventitious virus is avoided.

It is known that α-oxoaldehydes which can be represented by the formula:

wherein is the acyl group of an organic carboxylic acid having from 1 to 9 carbon atoms, inclusive, are antivirals. Published data (see, for example, J. Am. Chem. Soc., 79, 1682, 1957; J. Am. Chem. Soc., 79, 1687, 1957; and U.S. Patents 2,796,430, 2,889,243, and 2,893,912) indicate that the antiviral activity is closely associated with the α-oxoaldehyde structure and that wide variation in the nature of the R group is permissible, for example, R in addition to being hydrogen can be aliphatic, cycloaliphatic, or aromatic radicals of widely differing types, for example, lower-alkyl, lower-alkoxyalkyl, cycloalkyl and cycloalkenyl radicals containing not more than 8 carbon atoms, and aryl and aralkyl radicals of the benzene, furan, and thiophene series containing not more than 8 carbon atoms. The α-oxoaldehyde can be in the form of the free aldehyde, or in the form of addition compounds thereof, such as the sodium and potassium bisulfite addition compounds, and hydrates.

Suitable such α-oxoaldehydes include:

glyoxal,
glyoxal di(sodium bisulfite),
glyoxal sulfate,
methylglyoxal,
methylglyoxal di(sodium bisulfite) monohydrate,
β,β-dimethyl-α-ketobutyraldehyde hemihydrate,
hydroxymethyl glyoxal,
cyclopentylglyoxal,
cyclohexylglyoxal hemihydrate,
cyclohexylglyoxal mono(sodium bisulfite) monohydrate,
1-cyclopentenylglyoxal,
1-cycloheptenylglyoxal,
phenethylglyoxal,
β-ethoxy-α-ketoisovaleraldehyde.
β-ethoxy-α-ketopropionaldehyde,
β-ethoxy-α-ketopropionaldehyde monohydrate,
β-ethoxy-α-ketopropionaldehyde mono(sodium bisulfite),
β-isopropoxy-α-ketobutyraldehyde,
β-methoxy-α-ketopropionaldehyde,
β-methoxy-α-ketopropionaldehyde monohydrate,
β-butoxy-α-ketopropionaldehyde,
β-methoxy-α-ketobutyraldehyde,
β-methoxy-α-ketobutyraldehyde monohydrate,
β-methoxy-α-ketobutyraldehyde mono(soduim bisulfite),
β-methoxyethoxy-α-ketobutyraldehyde,
β-methoxyethoxy-α-ketobutyraldehyde monohydrate,
β-methoxyethoxy-α-ketobutyraldehyde mono(sodium bisulfite),
β-methoxyxmethoxyethoxy-α-ketobutyraldehyde,
β-ethoxy-α-ketobutyraldehyde,
β-ethoxy-α-ketobutyraldehyde monohydrate,
β-ethoxy-α-ketobutyraldehyde mono(sodium bisulfite),
β-(β-butoxyethoxy)-α-ketobutyraldehyde,
phenylglyoxal monohydrate,
p-chlorophenylglyoxal mono(sodium bisulfite),
p-bromophenylglyoxal mono(sodium bisulfite), p-hydroxyphenylglyoxal monohydrate,
p-hydroxyphenylglyoxal mono(sodium bisulfite),
p-methoxyphenylglyoxal mono(sodium bisulfite) monohydrate,
m-methoxyphenylglyoxal mono(sodium bisulfite) hemihydrate,
p-hydroxy-m-methoxyphenylglyoxal monohydrate,
p-nitrophenylglyoxal monohydrate,
p-acetamidophenylglyoxal monohydrate,
p-carbomethoxyphenylglyoxal monohydrate,
p-carbomethoxyphenylglyoxal mono(sodium bisulfite),
p-carboxyphenylglyoxal monohydrate,
p-carboxyphenylglyoxal mono(sodium bisulfite),
furanglyoxal monohydrate,
thiopheneglyoxal hemihydrate, and the like.

The process of the invention is carried out by adding an antiviral $\alpha$-oxoaldehyde to a suspension of attenuated or virulent poliomyelitis virus, and incubating for a time and at a temperature sufficient to inactivate any adventitious virus that may be present. Advantageously, a non-toxic dicarbonyl binding agent is then added in order to destroy any residual $\alpha$-oxoaldehyde by reaction therewith. Suspensions of any type of poliomyelitis virus, whether virulent or attenuated, can be used in the process.

Generally, from about 0.0001 to 1 mole of an antiviral $\alpha$-oxoaldehyde added to each liter of virus suspension is effective to inactivate any adventitious virus. A preferred concentration range of the antiviral $\alpha$-oxoaldehyde is from about 0.001 to 0.1 mole per liter of virus suspension. It will be understood, of course, that the optimum concentration of antiviral $\alpha$-oxoaldehyde for inactivation of adventitious virus will vary in accordance with the particular prevailing conditions, e.g., the amount and kind of contaminating virus, the time and temperature of incubation, etc., as will be readily apparent to those skilled in the art. The antiviral $\alpha$-oxoaldehyde is added to the virus-containing suspension and the mixture is incubated at 0° to 45° C., preferably at a temperature of 30° to 38° C. for a time sufficient to inactivate all the adventitious viruses that may be present. Illustratively, incubation is carried out for from 1 to 48 hours, preferably from 4 to 16 hours, at 37° C.

After incubation, a non-toxic dicarbonyl binding agent can if desired be added to the virus suspension in order to destroy any residual $\alpha$-oxoaldehyde. Any dicarbonyl binding agent is suitable provided it destroys the antiviral $\alpha$-oxoaldehyde and does not inactivate the poliomyelitis virus. Those which are characterized by a primary amino ($-NH_2$) group, and also an hydroxy ($-OH$), mercapto ($-SH$) or imino ($=NH$) group, are particularly efficacious, for example, cysteine, homocysteine, arginine, serine, threonine, ethanolamine, histidine, guanidine, 2-amino-1-butanol, and the like. Cysteine is a preferred binding agent, because it not only destroys residual $\alpha$-oxoaldehyde but also stabilizes the poliomyelitis virus. The binding agent, advantageously, is added in amounts up to about 10 times, preferably about 2 to 5 times, the molar concentration of the added $\alpha$-oxoaldehyde.

The suspension of poliomyelitis virus thus produced is free from infective adventitious virus, yet the poliomyelitis virus remains alive and infective.

The process of this invention is useful for killing adventitious viruses in the presence of either attenuated or virulent strains of poliomyelitis virus. Thus, serially passaged virulent virus (e.g., MEF-1 strain) or attenuated virus (e.g., New Orleans "P 712" strain) can be treated with an $\alpha$-oxoaldehyde in accordance with the process of the invention after each passage in order to kill any adventitious virus that might have propagated in the culture cells. In this way, the purity of the virus inoculum in subsequent passages or for commercial use is assured.

The following examples are illustrative of the process and products of the present invention, but are not to be construed as limiting.

EXAMPLE 1

A healthy rhesus monkey was sacrificed and the kidneys were removed. After stripping the suprarenal glands and capsules, and exising the hiler structures the kidney tissue was minced. A "Maitland type" or suspended cell culture was prepared by suspending the minced kidney tissue in 475 ml. of medium 199 (Proc. Soc. Exptl. Biol. Med., 73, 1–8, 1950) in a 5-liter Povitsky bottle; 25 ml. of calf serum was added. The minced tissue suspension was incubated for 6 days at 37° C. with gentle agitation. At this time the culture medium was changed and the cell suspension was inoculated with 3 ml. of poliomyelitis virus culture fluid containing $10^{6.1}$ $TCD_{50}$/ml. of the LS—a strain of type 1 poliomyelitis virus. Incubation was continued for 5 days at 36° C., and the culture fluid was harvested and passed through a bacteria-retaining filter.

The presence of B-virus in the filtered culture fluid was discovered by testing in rabbits. Each of 2 test rabbits weighed about 1000 grams and was given 1 ml. of the undiluted, filtered culture fluid intradermally at 10 sites along the shaved ventral surface (0.1 ml. per site). Characteristic vesicles developed at the inoculated sites and they became hemorrhagic ulcers. Both rabbits developed paralysis and died within 2 weeks. The identity of the B-virus was confirmed by serum-neutralization tests.

A 50-ml. portion of the culture fluid was then incubated with 0.25 g. (0.034 mole per liter) of added $\beta$-ethoxy-$\alpha$-ketobutyraldehyde monohydrate at 37° C. for 12 hours, and then 0.412 g. (0.068 mole per liter) of cysteine was added.

One ml. of this incubated culture fluid was injected intradermally into each of 4 rabbits (as described above). All four rabbits which were used in this test were alive and well 4 weeks after injection. The titre of poliomyelitis virus in this fluid was determined according to standard procedure to be $10^{6.2}$ $TCD_{50}$/ml.

EXAMPLE 2

A healthy rhesus monkey was sacrificed and the kidneys were removed. After stripping the suprarenal glands and capsules, and excising the hiler structures, the kidney tissue was macerated and the individual cells were released from the connective tissue by trypsinization according to the procedure of Dulbecco and Vogt, J. Exptl. Med., 99, 167–182, 1954, as modified by Youngner, Proc. Soc. Exptl. Biol. Med., 85, 202–205, 1954. The approximately 2 ml. of packed cells thus obtained were suspended in 400 ml. of medium 199 containing 5% calf serum. Four 10-ml. portions of the suspension were placed in T-60 flasks (Earle) for control cultures, and 45-ml. portions were placed in each of 8 prescription bottles (32 oz. size). The cell cultures were incubated for 5 days at 37° C., at which time the medium was changed and each of the 8 cultures was inoculated with 1 ml. of poliomyelitis virus culture fluid containing $10^{7.0}$ $TCD_{50}$/ml. of New Orleans "P 712" virus (a type 2 attenuated strain supplied by Dr. Albert Sabin, The Children's Hospital, Cincinnati, Ohio). Incubation was continued for 5 days at 36° C. The culture fluid containing virus was then harvested and passed through a bacteria-retaining filter.

On examination of the control cultures (uninoculated) under low-power magnification (100×) at the ninth day of incubation, degenerative changes were noted. Characteristic vacuolated areas and clusters of "fused" cells and nuclei were observed. Passage in roller-tube cultures indicated the contaminant to be a simian agent similar to the "foamy" agent described by Rustigian, Johnston, and Reihart, Proc. Soc. Exptl. Biol. Med., 88, 8–16, 1955.

A 5-ml. portion of the pooled culture fluid from the 8 bottles inoculated with poliomyelitis was treated with antiserum from a monkey hyper-immunized with the New Orleans "P 712" attenuated virus. Then 0.2-ml. portions of the fluid treated with antiserum were inoculated into fresh monkey kidney cell cultures in roller tubes. Incubation for 9 days at 37° C., followed by examination under low-power magnification as described above, indicated that the same viral agent that had been found in the control cultures was present as a contaminant with the poliomyelitis virus in the harvested fluid. A 200-ml. portion of the fluid was incubated with 0.4 g. (0.034 mole per liter) of glyoxal at 37° C. for 16 hours, and then 2.5 g. (0.102 mole per liter) of cysteine was added. Five 1-ml. portions of this fluid were treated with 1:10 dilutions of antiserum from a monkey hyperimmunized with the New Orleans "P 712" attenuated virus, as above. The thus-neutralized serial dilutions were inoculated, in 0.2-ml. amounts, into fresh monkey kidney cell cultures in roller tubes. After incubation and examination as above, no evidence of the adventitious virus was observed. Two serial sub-cultures were carried out and found to be negative. Assay of the fluid for poliomyelitis virus gave a titre of $10^{7.1}$ $TCD_{50}$/ml.

EXAMPLE 3

A tissue culture fluid containing strain MEF–1 of type 2 poliomyelitis virus, propagated in a "Maitland type" or suspended cell culture of minced monkey kidney tissue, was found to contain B-virus when tested intradermally in rabbits as described in Example 1. A 50-ml. portion of the culture fluid was then incubated at 37° C. for 4 hours with 0.25 g. (0.034 mole per liter) of added β-ethoxy-α-ketobutyraldehyde monohydrate, and then 0.412 g. (0.068 mole per liter) of cysteine was added. Employing the rabbit test, as in Example 1, the incubated culture fluid was found to be free of B-virus. The poliomyelitis virus titre was determined to be $10^{8.1}$ $TCD_{50}$/ml.

I claim:

1. The process which comprises incubating a suspension of artificially propagated, live poliomyelitis virus with an antiviral α-oxoaldehyde in concentration effective to inactivate adventitious virus.

2. The process which comprises incubating a suspension of artificially propagated, live poliomyelitis virus with an antiviral α-oxoaldehyde selected from the group consisting of glyoxal, glyoxal di(sodium bisulfite), glyoxal sulfate, methylglyoxal, methylglyoxal di(sodium bisulfite) monohydrate, β,β-dimethyl-α-ketobutyraldehyde hemihydrate, hydroxymethyl glyoxal, cyclopentylglyoxal, cyclohexylglyoxal hemihydrate, cyclohexylglyoxal mono(sodium bisulfite)monohydrate, 1-cyclopentenylglyoxal, 1-cycloheptenylglyoxal, phenethylglyoxal, β-ethoxy-α-ketoisovaleraldehyde, β-ethoxy-α-ketopropionaldehyde, β-ethoxy-α-ketopropionaldehyde monohydrate, β-ethoxy-α-ketopropionaldehyde mono(sodium bisulfite), β-isopropoxy-α-ketobutyraldehyde, β-methoxy-α-ketopropionaldehyde, β-methoxy-α-ketopropionaldehyde monohydrate, β-butoxy-α-ketopropionaldehyde, β-methoxy-α-ketobutyraldehyde, β-methoxy-α-ketobutyraldehyde monohydrate, β-methoxy-α-ketobutyraldehyde mono(sodium bisulfite), β-methoxyethoxy-α-ketobutyraldehyde, β-methoxyethoxy-α-ketobutyraldehyde monohydrate, β-methoxyethoxy-α-ketobutyraldehyde mono(sodium bisulfite), β-methoxymethoxyethoxy-α-ketobutyraldehyde, β-ethoxy-α-ketobutyraldehyde, β-ethoxy-α-ketobutyraldehyde monohydrate, β-ethoxy-α-ketobutyraldehyde mono(sodium bisulfite), β-(β-butoxyethoxy)-α-ketobutyraldehyde, phenylglyoxal monohydrate, p-chlorophenylglyoxal mono(sodium bisulfite), p-bromophenylglyoxal mono(sodium bisulfite), p-hydroxyphenylglyoxal monohydrate, p-hydroxyphenylglyoxal mono(sodium bisulfite), p-methoxyphenylglyoxal mono(sodium bisulfite) monohydrate, m-methoxyphenylglyoxal mono(sodium bisulfite) hemihydrate, p-hydroxy-m-methoxyphenylglyoxal monohydrate, p-nitrophenylglyoxal monohydrate, p-acetamidophenylglyoxal monohydrate, p-carbomethoxyphenylglyoxal monohydrate, p-carbomethoxyphenylglyoxal mono(sodium bisulfite), p-carboxyphenylglyoxal monohydrate, p-carboxyphenylglyoxal mono(sodium bisulfite), furanglyoxal monohydrate, and thiopheneglyoxal hemihydrate in concentration effective to inactivate adventitious virus.

3. The process which comprises incubating a suspension of artificially propagated, live poliomyelitis virus with an antiviral α-oxoaldehyde in concentration effective to inactivate adventitious virus and then adding a non-toxic dicarbonyl binding agent.

4. The process which comprises incubating a suspension of artificially propagated, live poliomyelitis virus with an antiviral α-oxaldehyde having the formula $$R-\overset{O}{\underset{\|}{C}}-\overset{O}{\underset{\|}{C}}-H$$

wherein $$R-\overset{O}{\underset{\|}{C}}-$$

is the acyl group of an organic carboxylic acid having from 1 to 9 carbon atoms, inclusive, in concentration effective to inactivate adventitious virus and then destroying any remaining α-oxoaldehyde with a non-toxic dicarbonyl binding agent selected from the group consisting of cysteine, homocysteine, arginine, histidine, serine, threonine, ethanolamine, guanidine, and 2-amino-1-butanol.

5. The process which comprises incubating a suspension of artificially propagated, live poliomyelitis virus with about 0.0001 to 1 mole per liter of a β-alkoxy-α-ketoaldehyde according to claim 4 and then adding about 0.0002 to 5 moles per liter of a non-toxic dicarbonyl binding agent selected from the group consisting of cysteine, homocysteine, arginine, histidine, serine, threonine, ethanolamine, guanidine, and 2-amino-1-butanol.

6. The process which comprises incubating a suspension of artifically propagated, live poliomyelitis virus with 0.034 mole per liter of β-ethoxy-α-ketobutyraldehyde and then adding 0.068 mole per liter of cysteine.

7. The process which comprises incubating a suspension of artificially propagated, live poliomyelitis virus with 0.034 mole per liter of glyoxal and then adding 0.102 mole per liter of cysteine.

8. A composition of matter consisting of live poliomyelitis virus and an aqueous medium substantially free from live adventitious virus, prepared by incubating a suspension of artificially propagated, live poliomyelitis virus with an antiviral α-oxoaldehyde in concentration effective to inactivate adventitious virus.

9. A composition of matter consisting of live poliomyelitis virus and an aqueous medium substantially free from live adventitious virus, prepared by incubating a suspension of artificially propagated, live poliomyelitis virus with an intiviral α-oxoaldehyde selected from the group consisting of glyoxal, glyoxal di(sodium bisulfite), glyoxal sulfate, methylglyoxal, methylglyoxal di(sodium bisulfite) monohydrate, β,β-dimethyl-α-ketobutyraldehyde hemihydrate, hydroxymethyl glyoxal, cyclopentylglyoxal, cyclohexylglyoxal hemihydrate, cyclohexylglyoxal mono(sodium bisulfite) monohydrate, 1-cyclopentenylglyoxal, 1-cycloheptenylglyoxal, phenethylglyoxal, β-ethoxy-α-ketoisovaleraldehyde, β-ethoxy-α-ketopropionaldehyde, β-ethoxy-α-ketopropionaldehyde monohydrate, β-ethoxy-α-ketopropionaldehyde mono(sodium bisulfite), β-isopropoxy-α-ketobutyraldehyde, β-methoxy-α-ketopropionaldehyde, β-methoxy-α-ketopropionaldehyde monohydrate, β-butoxy-α-ketopropionaldehyde, β-methoxy-α-ketobutyraldehyde, β-methoxy-α-ketobutyraldehyde monohydrate, β-methoxy-α-ketobutyraldehyde mono (sodium bisulfite), β-methoxyethoxy-α-ketobutyraldehyde, β-methoxyethoxy-α-ketobutyraldehyde monohydrate, β-methoxyethoxy-α-ketobutyraldehyde monohydrate, β-methoxymethoxyethoxy-α-ketobutyraldehyde, β-ethoxy-α-ketobutyraldehyde, β-ethoxy-α-ketobutyraldehyde monohydrate, β-ethoxy-α-ketobutyraldehyde mono(sodium bisulfite), β-(β-butoxyethoxy)-α-ketobutyraldehyde, phenylglyoxal monohydrate, p-chlorophenylglyoxal mono(sodium bisulfite), p-bromophenylglyoxal mono(sodium bisulfite), p-hydroxyphenylglyoxal monohydrate, p-hydroxyphenylglyoxal mono(sodium bisulfite), p-methoxyphenylglyoxal mono(sodium bisulfite) monohydrate, m-methoxyphenylglyoxal mono(sodium bisulfite) hemihydrate, p-hydroxy-m-methoxyphenylglyoxal monohydrate, p-nitrophenyl-glyoxal monohydrate, p-acetamidophenylglyoxal monohydrate, p-carbomethoxyphenylglyoxal monohydrate, p-carbomethoxyphenylglyoxal mono(sodium bisulfite), p-carboxyphenylglyoxal monohydrate, p-carboxyphenylglyoxal mono(sodium bisulfite), furanglyoxal monohydrate, and thiopheneglyoxal hemihydrate in concentration effective to inactivate advantitious virus.

10. A composition of matter consisting of live poliomyelitis virus and an aqueous medium substantially free from live adventitious virus, prepared by incubating a suspension of artificially propagated, live poliomyelitis virus with an antiviral α-oxoaldehyde in concentration effective to inactivate adventitious virus and then adding a non-toxic dicarbonyl binding agent.

11. A composition of matter consisting of live poliomyelitis virus and an aqueous medium substantially free from live adventitious virus, prepared by incubating a suspension of artificially propagated, live poliomyelitis virus with an antiviral α-oxoaldehyde having the formula $$R-\overset{\overset{O}{\|}}{C}-\overset{\overset{O}{\|}}{C}-H$$

wherein $$R-\overset{\overset{O}{\|}}{C}-$$

is the acyl group of an organic carboxylic acid having from 1 to 9 carbon atoms, inclusive, in concentration effective to inactivate adventitious virus and then destroying any remaining α-oxoaldehyde with a non-toxic dicarbonyl binding agent selected from the group consisting of cysteine, homocysteine, arginine, histidine, serine, threonine, ethanolamine, guanidine, and 2-amino-1-butanol.

12. A composition of matter consisting of live poliomyelitis virus and an aqueous medium substantially free from live adventitous virus, prepared by incubating a suspension of artificially propagated, live poliomyelitis virus with about 0.0001 to 1 mole per liter of a β-alkoxy-α-ketoaldehyde according to claim 11 and then adding about 0.0002 to 5 moles per liter of a non-toxic dicarbonyl binding agent selected from the group consisting of cysteine, homocysteine, arginine, histidine, serine, threonine, ethanolamine, guanidine, and 2-amino-1-butanol.

13. A composition of matter consisting of live poliomyelitis virus and an aqueous medium substantially free from live adventitious virus, prepared by incubating a suspension of artificially propagated, live poliomyelitis virus with 0.034 mole per liter of β-ethoxy-α-ketobutyraldehyde and then adding 0.068 mole per liter of cysteine.

14. A composition of matter consisting of live poliomyelitis virus and an aqueous medium substantially free from live adventitious virus, prepared by incubating a suspension of artificially propagated, live poliomyelitis virus with 0.034 mole per liter of glyoxal and then adding 0.102 mole per liter of cysteine.

References Cited in the file of this patent

UNITED STATES PATENTS

| | | |
|---|---|---|
| 2,399,443 | Masucci | Apr. 30, 1946 |
| 2,793,160 | McLean | May 21, 1951 |
| 2,893,912 | Musser | July 7, 1959 |

OTHER REFERENCES

Underwood et al.: Virology, 13, pp. 138–139, 1961.

Gard: World Health Organization Monograph Series No. 26, pages 215–235, 1955.

Lawrence: Surface Active Quaternary Ammonium Germicides, pub. 1950 by Academic Press Inc., New York, N.Y., pages 108–111.

Bock: Nature, Apr. 6, 1957, pages 706–707.

UNITED STATES PATENT OFFICE
CERTIFICATE OF CORRECTION

Patent No. 3,048,523                 August 7, 1962

Gerald E. Underwood

It is hereby certified that error appears in the above numbered patent requiring correction and that the said Letters Patent should read as corrected below.

Column 6, line 67, for "monohydrate" read -- mono (sodium bisulfite) --; lines 67 and 68, for "$\beta$-methoxymethoxymethoxy-ethoxy-$\alpha$-ketobutyraldehyde" read -- $\beta$-methoxymethoxyethoxy-$\alpha$-ketobutyraldehyde --.

Signed and sealed this 20th day of November 1962.

(SEAL)
Attest:

ERNEST W. SWIDER
Attesting Officer

DAVID L. LADD
Commissioner of Patents